United States Patent
Uribe

(10) Patent No.: US 9,351,579 B2
(45) Date of Patent: May 31, 2016

(54) MULTI-LAYERED ANATOMICAL QUILTED SYSTEM

(76) Inventor: Andres Escobar Uribe, Medellin (CO)

( * ) Notice: Subject to any disclaimer, the term of this patent is extended or adjusted under 35 U.S.C. 154(b) by 427 days.

(21) Appl. No.: 13/990,472

(22) PCT Filed: Jan. 5, 2012

(86) PCT No.: PCT/IB2012/000116
§ 371 (c)(1),
(2), (4) Date: Jun. 27, 2013

(87) PCT Pub. No.: WO2013/102777
PCT Pub. Date: Jul. 11, 2013

(65) Prior Publication Data
US 2014/0215720 A1    Aug. 7, 2014

(51) Int. Cl.
| | |
|---|---|
| B68G 5/00 | (2006.01) |
| A47C 16/00 | (2006.01) |
| A47C 7/02 | (2006.01) |
| A47C 27/14 | (2006.01) |
| A47C 27/15 | (2006.01) |
| B32B 5/32 | (2006.01) |
| B32B 7/02 | (2006.01) |

(52) U.S. Cl.
CPC . *A47C 7/021* (2013.01); *A47C 7/02* (2013.01); *A47C 27/148* (2013.01); *A47C 27/15* (2013.01); *B32B 5/32* (2013.01); *B32B 7/02* (2013.01); *B32B 2266/0278* (2013.01); *B32B 2307/51* (2013.01); *B32B 2307/54* (2013.01); *B32B 2307/734* (2013.01)

(58) Field of Classification Search
CPC ............. A61G 2005/1091; A61G 2005/124; A61G 13/123; A61G 5/1043; A61G 2005/1045; A47C 7/02; A47C 7/021; B32B 7/02; B32B 5/32; B32B 2266/0278; B32B 2307/734; B32B 2307/51; B32B 2307/54
See application file for complete search history.

(56) References Cited

U.S. PATENT DOCUMENTS

| | | | | | |
|---|---|---|---|---|---|
| 3,833,259 | A | * | 9/1974 | Pershing | B60N 2/70 244/122 R |
| 4,190,697 | A | * | 2/1980 | Ahrens | B29C 44/0461 264/168 |
| 5,797,155 | A | * | 8/1998 | Maier | A61G 5/1043 297/284.6 |
| 5,836,025 | A | * | 11/1998 | Poncy, Sr. | A47C 7/021 156/291 |
| 5,836,654 | A | * | 11/1998 | DeBellis | A47C 7/022 297/440.22 |
| 5,918,334 | A | * | 7/1999 | Laidlaw | A47C 7/021 297/452.25 |

(Continued)

*Primary Examiner* — David E Sosnowski
(74) *Attorney, Agent, or Firm* — Gottlieb, Rackman & Reisman, P.C.

(57) ABSTRACT

The invention relates to a Multi-layer Anatomical padding system which is developed based on the need of the human being for feeling comfort when performing the action of sitting, sleeping or support; the Multi-layer Anatomical padding system is composed of polymeric gel, visco-elastic polyurethane foam, flexible polyurethane foam in 2 different densities, wherein the polymeric gel is located in the lower part of the system followed by a visco-elastic polyurethane foam, followed by a flexible polyurethane foam, and finally another flexible polyurethane foam insert so, where the latter foam goes exclusively on the seats and will only help to reduce the pressure in the groin area through this insert having a conical elongated shape with rounded ends, which is located in the central part of the flexible polyurethane foam which has in turn the same basin form, that said insert fits into it, in which the layer of flexible polyurethane foam and the insert equal half the padding, and the polyurethane foam with viscoelastic polymer gel occupy approximately the other half.

1 Claim, 2 Drawing Sheets

(56) References Cited

U.S. PATENT DOCUMENTS

| | | | | |
|---|---|---|---|---|
| 6,009,578 A * | 1/2000 | Davis | A47C 7/021 | 297/219.1 |
| 6,018,832 A * | 2/2000 | Graebe | A47C 7/022 | 5/652 |
| 6,142,573 A * | 11/2000 | Harding | A47C 7/022 | 297/452.25 |
| 6,269,504 B1 * | 8/2001 | Romano | A47C 27/122 | 5/653 |
| 6,671,911 B1 * | 1/2004 | Hill | A61G 5/1043 | 5/655.3 |
| 9,021,637 B1 * | 5/2015 | Whelan | A61G 5/1043 | 297/452.25 |
| 2003/0061663 A1 * | 4/2003 | Lampel | A47C 27/146 | 5/653 |
| 2004/0098806 A1 * | 5/2004 | Stender | A47C 7/021 | 5/654 |
| 2004/0123391 A1 * | 7/2004 | Call | A61G 5/1043 | 5/630 |
| 2004/0237203 A1 * | 12/2004 | Romano | A47C 27/122 | 5/713 |
| 2004/0245837 A1 * | 12/2004 | Clifford | A47C 7/022 | 297/452.26 |
| 2007/0294831 A1 * | 12/2007 | Siekman | A61G 5/1043 | 5/653 |
| 2008/0184491 A1 * | 8/2008 | Kemper | A61G 5/1043 | 5/653 |
| 2009/0160236 A1 * | 6/2009 | Tsuber | A47C 4/54 | 297/452.26 |
| 2009/0222992 A1 * | 9/2009 | Loewenthal | A61G 5/1043 | 5/653 |
| 2009/0295203 A1 * | 12/2009 | Lewis | A61G 5/1043 | 297/219.1 |
| 2011/0245732 A1 * | 10/2011 | Mravyan | A61B 5/1116 | 600/587 |
| 2011/0258782 A1 * | 10/2011 | Call | A47C 7/021 | 5/655.3 |
| 2012/0068507 A1 * | 3/2012 | Debevec | A47C 7/021 | 297/250.1 |
| 2013/0180531 A1 * | 7/2013 | Choi | A61G 7/05776 | 128/889 |
| 2013/0198961 A1 * | 8/2013 | Davis | A47C 7/62 | 5/648 |
| 2013/0270881 A1 * | 10/2013 | Fowler | A61G 7/1023 | 297/219.1 |
| 2014/0049080 A1 * | 2/2014 | Corbett | A61G 5/1043 | 297/219.1 |
| 2014/0068840 A1 * | 3/2014 | Nauman | A42B 3/128 | 2/411 |
| 2014/0115790 A1 * | 5/2014 | Romano | A47C 27/122 | 5/652.2 |

* cited by examiner

MULTI-LAYERED ANATOMICAL QUILTED SYSTEM

TECHNOLOGICAL SECTOR

The present invention relates to a system of anatomical multi-layered quilted, based on the need of the human being of feeling comfort when performing the action of sitting, or lying, it has been shown for the case of sitting; that is not natural to humans, and that to do this activity for long periods of time the body is exposed to high levels of fatigue.

STATE OF THE ART

The invention relates to an anatomical padding system with multiple layers that is developed based on the need of the human being to feel comfort when performing the action of sitting, or lying. Humans have always tried to adapt the products and environments for its benefit, adapting them for their use. These products range from practical solutions to complex solutions that can have a high technological and innovative development, fusing materials, manufacturing processes and design, focused on the generation of feelings of comfort.

To solve the problems that these padding presents, due to its configuration and location of its layers, we will show the following cases.

In the case of seats, the market can offer a wide range of solutions focused on the design and materials. These can range from possible rigid materials such as metal and plastic, to flexible polyurethane or mixtures thereof, as shown below:

U.S. Pat. No. 5,108,076 "Anatomical multilayer bicycle seat" inventor: Miguel A. Chiarellay, which focuses solely on a contoured seat with multiple layers for its use in a bicycle or the like and which comprises a substantially rigid reservoir cover formed by a flexible cover which has a smooth layer of gel material encapsulated between the inner surface of the seat and the cover, where complete anatomical comfort is not achieved, since there is no improvement of blood flow in the inguinal area, nor does it generates a better distribution of pressure in the body contact area of the buttocks specifically with respect to conventional contact areas and this is due in part to its configuration of standard seat (with nose), and wherein either inserts nor other components are included that provide greater stability, elasticity and strength.

U.S. Pat. No. 5,203,607 "Bicycle seat" refers to an improved bicycle seat comprising a rigid base, and then a foam layer having a thermoplastic elastomeric pad honeycomb shaped embedded within the said foam. A Resistant coating that covers it and the foam padding layers, where despite having more material combination they don't achieved full anatomical comfort as also fails to improve blood flow in the groin area, or generate a better pressure distribution in the body contact area of the buttocks specifically with respect to conventional contact areas and this is due in part to their standard seat configuration (with nose) only incorporates a honeycomb shape, and wherein either include other components such as a polyurethane material additional viscoelastic polymeric gel, thermoplastic gel and different from the flexible polyurethane or inserts to provide greater stability, elasticity and strength.

The Patent E52195486 multilayer material presents a laminate suitable for sports and medical use comprising an intermediate layer based on a polyurethane gel material. The intermediate layer material is a polyurethane-based gel with a chemical structure of long strands of polymer and very little interlaced without adding plasticizer, and has a polyurethane film on both sides. On one side, there is an outer textile layer adhesively bonded and which consists of two tissue surfaces joined together by threads. In this patent, although it shares with our application the use of flexible polyurethane gel, its configuration cannot achieve complete anatomical comfort, since it is not intended to improve blood flow in the inguinal area, and this is due in part to their standard seat configuration (with nose), and wherein either includes inserts or other components that improve the flow of blood in the inguinal area with a low density flexible polyurethane, in turn providing more stability, elasticity and strength.

The patent US2008/0193699 Methods manufacturing integral elastic supports, and obtained support With This method the invention is applicable in the field of sports accessories and in particular relates to a process for making elastic supports, as well as the process for making elastic supports. The invention also relates to a mold for manufacturing such supports, as well as a molding apparatus. The process comprises the step of forming at least one filter element (2) of resilient material, associated to a frame (3) made of a semi rigid or substantially rigid material whose outer edge (8) defines a peripheral portion (9), in combination with the said cushion (2). The process is characterized by comprising a step of forming a strip (10) of substantially impermeable material around the peripheral portion (9), to prevent any infiltration. In this patent, although shares with our application the use of flexible and visco-elastic polyurethane, its configuration cannot achieve a complete anatomical comfort, since it is not intended to improve blood flow in the inguinal area, and partly because it Seat its standard configuration (with nose), and wherein either or inserts includes other components that improve the flow of blood in the inguinal area with a low density flexible polyurethane, in turn providing more stability, elasticity and mechanical strength.

DESCRIPTION OF THE INVENTION

The anatomical multi-layer padding system is developed based on the need of the human being to feel comfort when performing the action of sitting as it has been shown that sitting is not natural to humans, and that when performing this activity for extended periods of time the body is exposed to high levels of fatigue.

Humans have always tried to adapt the products and environments for its benefit, adapting them for their use. These products range from practical solutions to complex solutions that can have a high technological and innovative development, fusing materials, manufacturing processes and design, focused on the generation of feelings of comfort.

In the case of seats, the market can offer a wide range of solutions focused on the design and materials. These possible materials may vary from rigid as metal and plastic, to flexible polyurethane or mixtures among them. Our application is an anatomical multi-level system composed of polymeric gel, viscoelastic polyurethane foam, and flexible polyurethane foam with two different densities. (See FIG. 1)

The polymeric gel is located in the lower part of the system followed by a foam the visco-elastic polyurethane with an average density of 110 Kg/m3 to 150 Kg/m3 with specific hardness of (34-44 Shore 000), then a flexible polyurethane foam with a density between 68 Kg/m3 to 74 kg/m3 and a specific hardness of (41-51 Shore 000), and finally another flexible polyurethane foam with a density between 60 Kg/m3 to 67 kg/m3 with a specific hardness different from the above (30-40 Shore 000) that eases the pressure in the groin area.

The advantages of the product for use in seats are
Improves the user comfort feeling.
Generates a better distribution of body pressure in the contact area specifically the buttocks with regard to conventional contact areas (see FIGS. 2 and 3). In these figures, we can observe that having a multi-layer anatomical system obtains less red areas, which are those under most pressure.
Increases blood flow in the inguinal region.
Reduces the pressure on the tailbone area.
Reduces the pressure on the genital area.
Materials
1.1 Flexible Foams Flexible foams are generally characterized as a low-density cellular material 121 Kg/m3 up to 120 Kg/m3 with a compressive strength, which is limited and reversible. The most used Flexible foam types are block foams with water as blowing agent and molded flexible foams. Both are used for automobiles and furniture/mattresses with damping applications. Additionally, technical products as semi-rigid and viseoelastic polyurethane are used in special applications.

Flexible polyurethane foams are composed essentially of two polymers chemically interlinked:

A urethane polymer formed by the reaction of a high molecular weight polyol which acts as a flexible segment and an isocyanate which may be di- or poly-functional. The resulting network of elastomeric polyurethane gives the foam the stability, elasticity and strength.

A polymer of urea generated by the reaction of isocyanate and water. The generated carbon dioxide acts as the blowing agent, which forms the cellular network. The Urea groups, physically linked via strong hydrogen bonds are separate phases that form hard segments that contribute to loading properties.

The diisocyanates used for the synthesis of such polymers can be aromatic, short chain aliphatic or long chain aliphatic, and cyclic aliphatic, the choice of monomer depending on the final application of the product. Among the most employed diisocyanates are: toluene diisocyanate (TDI), methylene diphenyl isocyanate (MDI), hexamethylene diisocyanate (HDI), among others (Krol, 2007).

Polyols used for the synthesis of foams can be polyols or prepolymeric compounds with at least two hydroxyl groups. The polyols employed are: polyether polyol, polyester polyol, hydroxyl-terminated polyolefins and vegetable oils containing OH groups. (Ashida, 2007)

To obtain a low-density foam 121 Kg/m3 to 120 Kg/m3 in molecular terms requires a high level of water. Thus, the urea reaction dominates the reaction of urethane and is the major contributor to the exothermic reaction of the foam.

The foam formation occurs in about 90 seconds and this occurs in several steps, which occur in physical, chemical and morphological changes. Initially, the raw materials are mixed and air nucleation starts at the time of initiation occurs cream growth begins the formation of the foam, the formation reaction of urea and CO2 saturation, while foam growth occurs a viscosity increase takes place, expansion of bubble coalescence and, wall thinning and gas diffusion, urethane forming reaction begins, increases the molecular weight and initiates the formation of bonds which gives structural property. At the end of growth ends the formation of gas, hydrogen bonds are formed and the separation of the phases takes place (urea aggregate formation). Subsequently there is the curing of the foam in which the final hardness is achieved (between 30-500 N expressed at 40% of compression) the curing process ends after 24 hours.

The great advantages of molded foams, in comparison with block foams are improved productivity because the parts obtained have the required form and no additional processes are required, the reduction in the level of residues and the ability to produce a wide variety of shapes and combining different foam hardness, density and other properties specified for each application.

There are two processes for the production of molded foams; Cold curing and hot curing process. Most processes are accomplished by cold curing Operating at a mold temperature from 30 to 602 C, the rest is done by hot curing process. This technology is generally based on the use of an ethylene oxide type such as ethylene oxide or propylene oxide, polyols of high molecular weight (2000-3000), and isocyanates TDI or MDI, either alone or in mixtures.

This process, in addition to providing improved productivity, it also provides the versatility of formulation and excellent foam quality and consistency. Most cold cure formulations generate high resilience foams, which are greater than 45%.

TDI

Typical Physical and Chemical Data

| | |
|---|---|
| Aspect | Liquid |
| Color | From colorless to pale yellow |
| Odor | Strong, caustic |
| Relative density to the air (method EEC A3) | 1.223 g/cm (a 20° C.) |
| Viscosity | 3 mPa s (a 25° C.) |
| Steam density | 6 (air = I) |
| Steam Tension | 0.03 hPa (a 25° C.) |
| Saturated steam concentration | 160 mg/m$^3$ (a 25° C.) |
| Water solubility | Insoluble; reacts with water and generates CO2 |
| Boiling point (method EEC A2) | 250° C. aprox. (a 1013 hPa) |
| Freezing point 2,4-TDI | 21° C. |
| 2,4/2,6-TDI 80/20 | 10° C. |
| 2,4/2,6-TDI 65/35 | 4° C. |
| Flame point (method EEC A9) | 132° C. |
| Self-flame point (method EEC A15) | >595° C. |
| Interval of flammability (2,4-TDI) | Inferior: 0.9% v/v (118° C.) |

170 MDI

Typical Physical and Chemical Data

| | Monomer | Polymer |
|---|---|---|
| Aspect | Liquid above de +39° C. Solid below 5 $^2$C. | Liquid viscose |
| Color | From white to pale yellow | Maroon* |
| Odor | Lightly moldy | Lightly moldy |
| Relative density to the air (method EEC A3) | 1.33 (a 20° C.) 1.20 (a 50° C.) | 1.24 (a 20° C.)* |
| Viscosity | 4.7 mPa s (a 50° C.) n/a while in solid state | 100-2000 mPa s (a 25 $^2$C.)* |
| Steam density | 8.5 (air = I) | 8.5 (air = 1) |
| Steam tension | 1 × 10$^{-4}$ hPa aprox. (a 45 $^2$C.) | <1 × 10$^{-5}$ hPa (a 25° C.) |
| Saturated steam concentration | 1.5 mg/m3 (calculated at 45° C.) | 3 < 0.15 mg/m (calculated at 25° C.) |
| Water solubility | Insoluble in water, reacted CO$_2$ | Insoluble in water, reacted CO$_2$ |
| Boiling point (method EEC A42) | >300° C. (a 1013 hPa) se | >300° C. (a 1011 hPa) se |

|  | decomposes/polymerizes | decomposes/polymerizes |
| --- | --- | --- |
| Freezing point/fusion | 41 ± 2° C. | 5° C.; crystalises below 10° C. |
| Flame temperature | >200° C. (method EEC A9) | >200° C. |
| Temperature of self-flammability (method EEC A15) | >600° C. | >600° C. |
| Flammability interval(superior and inferior) | Does not apply | Does not apply |
| Thermic degradation | >230° C. | >230° C. |

The concept of comfort is based on a combination of:
Load capacity.
Pressure distribution on the human body.
Diffusion properties of heat and moisture.

The pressure distribution is a function of the hardness of the foam, the hysteresis and the shape of the seat. They have introduced many innovations in seat design to optimize this feature, as channeled foam surfaces or structured textiles.

The use of dual hardness pads has become popular for a number of designs of seats in general; these variations include various rigid and flexible foams. These dual hardness pads were originally made in several steps, or by using reground foam inserts. They can now be produced in a single operation using a complex injection system, injecting simultaneously with the main portion 185 is softer than the mold side part. This can be done with two mixing heads, or one head in a programmed sequence. A wide range of hardness can be produced in a unique formulation based on MDI, simply changing the isocyanate index as TDI-based systems, are often required two different formulations of polyol.

1.2 Visco Elastic Foam

The viscoelastic foam has been known for many years, but its adoption by the foam industry is relatively new. Some applications are molded soft pillows, orthopedic cushions and toys. Among block foam Applications are mainly high comfort new designs in the area of the mattresses, which includes a conventional foam core, which provides a high load resistance and an upper layer of visco-elastic, designed to distribute the body pressure over a wider area. Viscoelastic foams are often used for the dynamic comfort because of its high vibration absorption properties. The viscoelastic foam combines the properties of resilience of the foams and viscous materials and are generally characterized by a slow response to static or dynamic strain.

The cushioning area is used to improve static comfort through a more uniform pressure distribution. Interestingly, the equations for the module versus time and temperature have similar shapes so that the dynamic-mechanic thermal analysis can be used to study and predict relaxation phenomena.

From a polymer viewpoint, the viscoelastic foam is characterized by a vitreous transition temperature, which depends on the place where it is this is close to the environment temperature. This makes possible to recover the foam slowly after compression and relaxation and is often used to characterize the viscoelasticity There are many routes for the viscoelastic foam formulation, but most modify the morphology of the foam to reduce the strength of the polymer component in a specific temperature range near room temperature. Variations can be achieved by using individually or in combination as follows: crosslinking low molecular weight polyol mixtures of high and low molecular weight mixtures of polyether and polyester polyols, polyol mixtures with different content of ethylene oxide, using alkoxylated alcohols, isocyanate index variations, introduction of plasticizers, creation of interpenetrating polymer networks and mixtures of polyurethanes with other polymers.

1.3 Polyurethane Gels

Gels are polyurethane elastomers with a very low module and a hardness (as low as flexible foams) that have been known for a long time, but its commercial use began relatively recently. They are now being used for damping applications as pads in seats.

Unlike flexible foams, they are not compressible, so they extend laterally further increasing the contact area and that softens the pressure distribution.

Traditionally, polyurethane gels have been produced using plasticisers, but recent developments in the MDI technology diphenylmethane diisocyanate (MDI), combined with polyether polyols of high molecular weight, have resulted in the production of reagents and reactors in which the formulations can be modified to provide a wide range of viscoelasticity and resilience for different applications. (Lee, Randall, 2002)

2. Pressure Distribution 2.1 Pressure Measurement Technologies

The main types of sensors that have been reported in the literature for the measurement of the pressure interface of the seats are electronic, pneumatic and electro-pneumatic.

Electrical transducers consist of a deformable component with a detection element of 240 attached. A force applied results in a variation in resistance or capacitance, which can be measured electrically. This type of technology has been used in many studies, such Bush (1969), Herzberg (1972), and Mueller-Limmroth Diebschlag (1981), Drummond et al (1982), and more recently by Gross et al (1994) and Kalpen et al (1995). Although previous technologies were not reliable in terms of repeatability and validity, recent developments in electronic technologies have led to reproducible and accurate measurements in some new systems commercially available. The tire sensor is an air cell connected to an air reservoir. To inflate the sensor, the air tank pressure should be slightly higher than that applied to the sensor. As the tire pressure rises above the pressure applied, the volume of air in the sensor 250 suddenly increases, causing an abrupt drop in the pressure rise rate. The pressure in the air reservoir in which this change in the rate of pressure rise is recorded as the interface pressure applied. These principles were used by Bader (1982), Bader et al (1984) and Bader and Hawken (1986), in developments such as the Talley Pressure Monitor (TPM) that is commercially available.

The electro-pneumatic sensors are electrical contacts on an inner surface of a flexible, inflatable bag. Air is pumped into the bag and when the internal and external pressure are in equilibrium, the electrical contact is broken and the pressure at this point is recorded as the pressure at the interface.

2.2 Techniques for Proper Measurements

A variety of different measurement techniques can be used to determine the exact pressures under each device. No system has been established and identified as the only or the best way to measure this pressure. However, it is recommended to take into account the following specifications:

The sensor must be thin and flexible. We recommend a maximum thickness of 0.5 mm.

The sensitive area of the sensor should be adjustable and optimal for different applications (legs, hands, fingers, etc.) and for different measurement systems.

The sensor must be able to be in contact with your legs for long periods of time without irritating the skin and maintain its accuracy.

The pressure measurement systems allow continuous pressure measurements during active or passive movements of the patient.

Easy calibration of the sensors is desirable before each measurement.

Multiple sensors, which allow simultaneous measurement of pressures under the device in the various anatomical locations, may be preferred over a single sensor.

2.3 Distribution of Pressure in the Human Body

The comfort of the drivers is strongly related to several seat designs factors, such as the position, extent, ease of adjustment and vibration environment. The comfort of the driver has been associated with the pressure distribution of the interface between the human body and the support surface of the seating.

A number of studies conducted on humans sitting in a static environment concluded that inadequate pressure distribution can cause skin ulcers among paralyzed patients with numbness in weight supporting areas, discomfort and quick fatigue (Sember, 1994). The chairs of the vehicle drivers are also subject to terrain that induce vibrations, particularly when driving off-road or heavy vehicles, which contribute to discomfort and fatigue (International Organization ISO/DIS 2631-1.2, 1995). The designs of the drivers seat to improve comfort need to consider the pressure distribution of the interface of the driver and the seats under a dynamic vibration.

Extensive analysis and experimental studies on vibration of the vehicle and driver have established a relationship between magnitude and frequency of the vibrations of the vehicle and the driver unconformities (Griffin, 1990). The effectiveness of the natural low frequency of the seats suspension reduce exposure to the vehicular vibration that drivers have reported (Boileau, 1995). The influence of seat cushion designs in seating comfort and the driver position have been evaluated through a number of subjective and objective studies.

Studies show that the pressure of a soft seat interface are better uniformly distributed in a large contact area than with the rigid seats. The maximum pressure in the soft seating is significantly reduced compared with the rigid seat (X. Wu, 1998).

3. Genital Numbness and Sexual Dysfunction

Workers who are sitting because of his work may be at risk of 305 genital numbness or sexual health problems or reproductive problems caused by pressure in the groin by traditional seats.

NIOSH is the National institute for Occupational Safety and Health in the United States, responsible for conducting research and recommendations for the prevention of diseases and work-related injuries and has conducted studies that demonstrate the efficiency of noseless seats in reducing pressure in the groin and improving the sexual health of male police officers. While most workers in jobs that involve cycling are men, recent evidence suggests that the seats without nose can also benefit women.

A study by NIOSH (Lowe et al, 2004) shows that the seats without the protrusion of the nose (FIG. 4) largely reduce the pressure in the groin that compresses the nerves and arteries to the genitals. The study shows that the pressure is reduced in the groin at least 65% (NIOSH, 2009), in FIG. 5 we see that the red dots are those of higher pressure and in the crotch portion we do not observe any pressure points.

DETAILED EXPLANATION OF THE DRAWINGS

FIG. 1. Composition of the anatomical padded multi layers System that contains a polymeric gel (1) located in the lower foam system used in a visco-elastic polyurethane (2), followed by a flexible polyurethane foam (3), and by Finally another flexible polyurethane foam by way of insert (4), where the latter foam, is exclusively in the seat (10) and helps reduce the pressure in the groin area through the insert (4) which is tapered-elongate with rounded ends, which is located in the central part of the flexible polyurethane foam (3) which has in turn the same way to form a basin, so that the said insert (4) Fitts in it, where seat-layer flexible polyurethane foam (3) and the insert (4) amounts to half of the padding, and the polyurethane foam visco-elastic (2) together with the polymeric gel (1) occupy approximately the other half.

FIG. 2. Pressure map of the contact area with anatomical multi-layer system where the area (5) corresponds to the greater pressure exerted on the seat (10), and in which is seen that this zone is the area having a smaller surface area which is shown in dark color (red); Due to the configuration of polymeric gel (1) which is located at the bottom of the system followed by foam made of visco-elastic polyurethane (2) with an average density from 110 Kg/m3 to 150 Kg/m3 with specific hardness (34-44 Shore 000), followed by a soft polyurethane foam (3) with a density from 68 Kg/m3 to 74 Kg/m3 and a specified hardness of (41-51 Shore 000), and finally another Flexible polyurethane foam by way of insert (4) with a density of 60 Kg/m3 to 67 Kg/m3 with specified hardness different from the previous (30-40 Shore 000), wherein the latter foam, is exclusively in the seat (10)

FIG. 3, Pressure map of the contact area with conventional flexible foam, where the area (5) corresponds to the greater pressure exerted on the (12) conventional seat, and in which is seen that this area is the area having a larger surface inside and is dark in color (red).

FIG. 4. Seat (10) without the protrusion of the nose, where the difference is observed with the conventional seat (12) in the inguinal area (6) in a top view on the left side of the figure and in a side view of the seat (12) where there is also shown the location of the pelvis bones (11).

FIG. 5. Example of a pressure measurement of the saddle without the nose

THE BEST EMBODIMENT OF THE INVENTION

The best embodiment is when the MULTI-LAYERED ANATOMICAL QUILTED SYSTEM is comprised of multi-layer polymeric gel, polyurethane foam visco-elastic, flexible polyurethane foam with 2 different densities, wherein the polymeric gel (1) is located on the lower part of the System followed by a visco-elastic polyurethane (2) with an average density of 110 Kg/m3 to 150 Kg/m3 with specific hardness (34 Shore¬ 44 000), followed by a flexible polyurethane foam (3) of density between 360 68 Kg/m3 to 74 Kg/m3 and specifies hardness (Shore 41-51 000), and finally another flexible polyurethane foam by way of insert (4) with a density between 60 Kg/m3 to 67 Kg/m3 with different specific hardness than the previous (30-40 Shore 000), in which the latter foam will be exclusively between the seats and will only help to reduce the pressure in the groin area through this insert having conical elongated shape with rounded ends, which is located in the central portion of the flexible polyurethane foam (3) which has in turn the same form like a a basin, so that the insert (4) fits in it, wherein the layer of flexible polyurethane foam (3) and the insert (4) amounts to half of the padding, and the polyurethane visco-elastic foam and the (2) together with the polymeric gel (1) occupy approximately the other half.

It may also comprise a polymeric gel (1) which is located in the lower trapezoidal system which has two parallel sides of the trapezium that are called bases and the distance between them is called its height with its rounded ends, followed by visco-elastic Polyurethane foam (2) and a flexible polyurethane foam (3) with ovoid shape which is a closed smooth curve formed by a semicircle, two equal arcs and another uneven which in this case is flattened at one end and finally another flexible polyurethane foam by way of insert (4) which is tapered, elongated with rounded ends with different hardness to the above specified foam; wherein the configuration of the seat may be designed or not without the protrusion of the nose which reduces the pressure in the groin area.

The configuration in different padded saddles comprises a polymeric gel (1) which is located in the lower part of a visco-elastic polyurethane foam system (2) with an average density of 110 Kg/m3 to 150 Kg/m3 with a specified hardness of (34-44 Shore 000), followed by a flexible polyurethane foam (3) of density between 741 Kg/m3 and 68 Kg/m3 and a specific hardness of (41-51 Shore 000), which may also have a layer of flexible polyurethane foam (3) equal to half of the padding, wherein the visco-elastic polyurethane foam (2) together with the polymeric gel (1) occupy approximately half.

Figure 1:
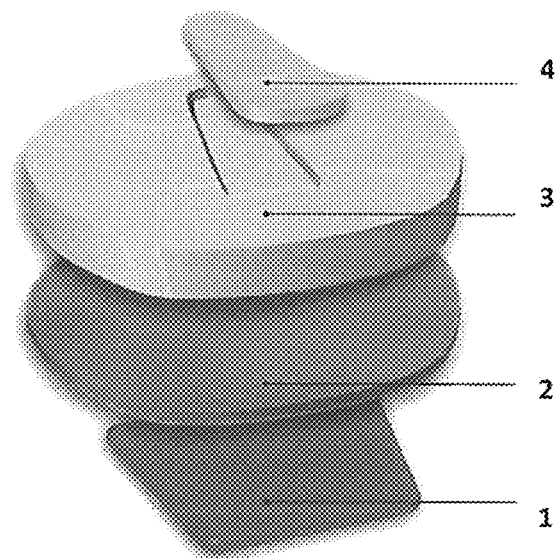
FIG. 1. System Composition
Figure 2:
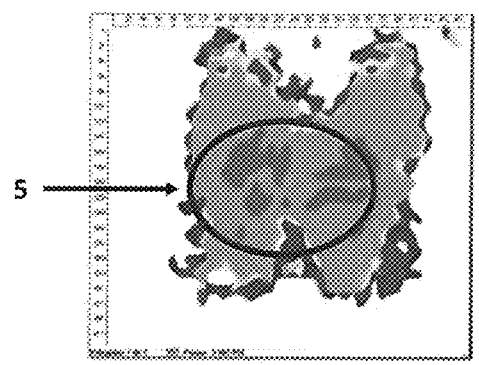
FIG. 2. Contact area Pressure map of the multi-layer anatomical system
Figure 3:
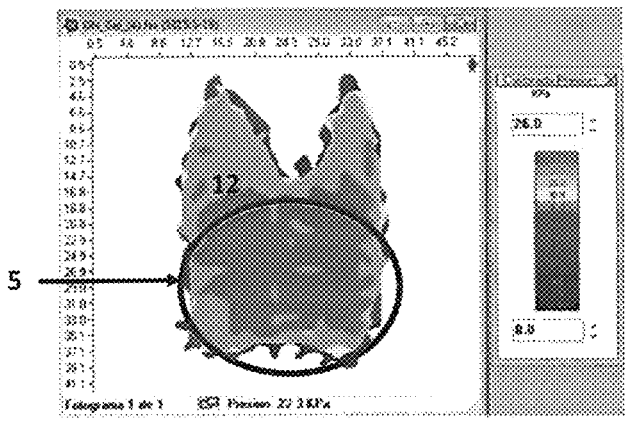
FIG. 3. Contact area Pressure map with conventional flexible foam
Figure 4:
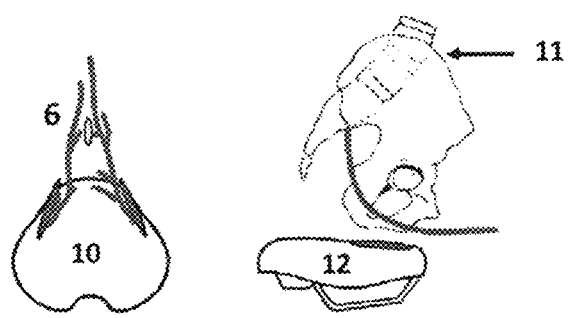
FIG. 4. Seat without the protrusion of the nose
Figure 5:
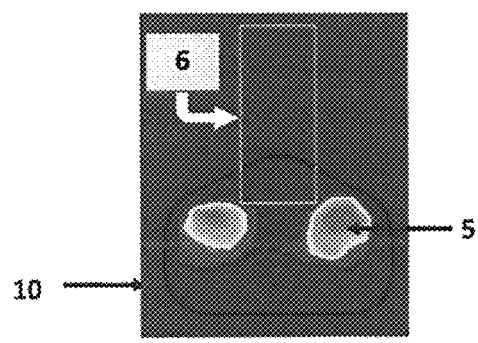
FIG. 5. Example of a pressure measurement of the saddle without the nose

The invention claimed is:

1. A multi-layer anatomical padding system comprising:
a layer of polymeric gel, a layer of viscoelastic polyurethane foam located directly above the layer of polymeric gel, a layer of flexible polyurethane foam located directly above the layer of viscoelastic polyurethane foam and having a centrally located recess, and a flexible polyurethane foam insert located within the recess, the flexible polyurethane foam insert being configured to reduce pressure upon a groin of a user seated upon the system;
the layer of viscoelastic polyurethane foam has an average density of between 110 Kg/m3 and 150 Kg/m3 and a specific hardness of between 34 and 44 Shore 000, the layer of flexible polyurethane foam has a density of between 68 Kg/m3 and 74 Kg/m3 and a specific hardness of between 41 and 51 Shore 000, and the flexible polyurethane foam insert has a density of between 60 Kg/m3 and 67 Kg/m3 and a hardness value which is different from the 41-51 Shore 000 of the layer of flexible polyurethane foam;
wherein the layer of polymeric gel is shaped as an isosceles trapezium with rounded ends, the layer of viscoelastic polyurethane foam and the layer of flexible polyurethane foam each are ovoid shaped, and the flexible polyurethane foam insert has a conical elongated shape with two opposing rounded ends wherein the insert is tapered such that a width of the insert decreases from one end to the other, the recess having the same shape as the flexible polyurethane foam insert; and
wherein the layer of flexible polyurethane foam and the flexible polyurethane foam insert occupy approximately half of the total volume of the padding system and the layer of viscoelastic polyurethane foam together with the layer of polymeric gel occupy approximately the remaining half of the total volume of the padding system.

\* \* \* \* \*